C. ANDRADE, Jr.
DOUBLE ACTING WINDLASS.
APPLICATION FILED SEPT. 27, 1911.

1,018,545.

Patented Feb. 27, 1912.
5 SHEETS—SHEET 4.

WITNESSES:
David J. Walsh
Guy W. Hodges

INVENTOR
Cipriano Andrade Jr.

COLUMBIA PLANOGRAPH CO., WASHINGTON, D. C.

C. ANDRADE, Jr.
DOUBLE ACTING WINDLASS.
APPLICATION FILED SEPT. 27, 1911.

1,018,545.

Patented Feb. 27, 1912.
5 SHEETS—SHEET 5.

WITNESSES:
David J. Walsh
Guy W. Hodges

INVENTOR
Cipriano Andrade Jr

UNITED STATES PATENT OFFICE.

CIPRIANO ANDRADE, JR., OF NEW YORK, N. Y.

DOUBLE-ACTING WINDLASS.

1,018,545.          Specification of Letters Patent.      Patented Feb. 27, 1912.

Application filed September 27, 1911. Serial No. 651,581.

*To all whom it may concern:*

Be it known that I, CIPRIANO ANDRADE, Jr., a citizen of the United States, residing at 328 West Eighty-fourth street, in the city of New York, in the county of New York and State of New York, have invented a new and useful Double-Acting Windlass, of which the following is a specification.

My invention relates to improvements in double acting windlasses, and I have shown the same as applied to an automatic trip and brake device for windlasses, of the kind shown in my United States Patent No. 988,428, of April 4, 1911, although it is equally applicable to any form of pawl and ratchet windlass.

The objects of my invention are to provide a double acting windlass which shall be simple, positive, easy to handle, and compact; to provide a windlass operable by two handle bars in which the chain may be drawn in with a continuous motion, or in which the power of both handle bars may be concentrated for heaving.

I attain these objects by the mechanism illustrated in the accompanying drawings, in which:

Figure 1 is a longitudinal section in elevation of my device, viewed from the bow of the boat, taken on the line $x$—$y$ (Fig. 2). It will be noted that horizontal windlasses are usually made double, *i. e.* with two heads, identical with one another in all respects, and therefore Fig. 1, to represent a double windlass, should be carried out symmetrically to line $s$—$t$. For the purpose of saving space, only the starboard side of the double windlass is shown in Fig. 1. Figs. 2, 4, 5, 12, 13 and 14 are all shown in the same position relative to horizontal reference line $m$—$n$.

Similar letters refer to similar parts throughout the several views.

A is a bed plate.

B is a web plate perpendicular to A and integral therewith.

C is a sleeve perpendicular to web plate B and integral therewith.

D is a trip ring free to revolve about sleeve C as an axis.

E is a drum with ratchet teeth O, all revolving freely about sleeve C as an axis.

M is a wildcat integral with drum E.

F is a spider stationary with reference to sleeve C.

G is a tie rod with thread I engaged by nut H, whose function is to hold spider F rigidly to the end of sleeve C.

J are wedge surfaces integral with web plate B, with their lower edges J′ away from plane surfaces K, and flush with the face of web plate B; and with their upper edges adjacent to plane surfaces K. Plane surfaces K are parallel with the surface of web plate B, and are on the level of the upper edges of wedge surfaces J.

Q are the back faces of wedging members JK. Faces Q are perpendicular to the face of web plate B.

L is a chain pipe integral with bed plate A, its function being to allow the chain to run down from the wildcat M into the chain locker below deck.

L′ is a tongue fixed with reference to bed plate A and extending to the bottom of the groove in the wildcat M, for the purpose of disengaging the chain, if it should become jammed in wildcat M.

N is a barrel integral with E and M.

L''' is a lug integral with web plate B, having a hole $e$ perpendicular to web plate B. Hole $e$ takes pin $d$ in holding pawl $a$, and said pawl rotates to a limited extent about pin $d$ as an axis. Pin $d$ has a thread $d'$ to take a nut $d''$ on the back of web plate B. This nut should preferably have a washer $a'$ under it and be fastened with a pin $d'''$.

P is a cam surface on the periphery of web plate B; its function is to engage trip lug Z of heaving pawl X and thereby trip said pawl.

$f$ is a peripheral surface adjoining the outer edge of cam surface P and concentric with sleeve C.

Y is a pin integral with heaving pawl X, and rotating in hole T in trip ring D.

Y' is a threaded portion on pin Y, to engage a nut Y'' preferably with washer X' and pin X''.

R is a cam surface on the periphery of trip ring D; its function is to engage trip lug $c$ of holding pawl $a$, and thereby trip said pawl.

S is a peripheral surface adjoining the outer edge of cam surface R and concentric with the periphery of trip ring D and with sleeve C.

U is a handle bar socket, into which a handle bar is inserted, whereby trip ring D may be rotated about sleeve C as an axis.

V are wedge surfaces integral with trip ring D, and lying on the side of D adjacent to web plate B. The lower edges V' of wedge surfaces V are away from plane surfaces W, and are flush with the face of trip ring D; the upper edges of wedges V are flush with plane surfaces W. Plane surfaces W are parallel with the face of trip ring D.

W' are the back faces of wedging members VV'W. Faces W' are perpendicular to the back faces of trip ring D. Wedge members J'JK and VV'W are so placed on web plate B and trip ring D respectively that, at a certain point of rotation of ring D about sleeve C, the wedge members JJ'K and VV'W will register with one another. The plane surfaces K are in rotative contact with the back face of trip ring D, and the plane surfaces W are in rotative contact with the front face of web plate B.

$b$ is a counterweight on holding pawl $a$, its function being to make pawl $a$ engage in ratchet teeth O.

A' are bolt holes in bed plate A to fasten the windlass to the deck; $l$ and $l'$ are clamps to hold tongue L' in position in jaws L'', $l''$ are bolts to hold clamp $l$ and $l'$ together.

C' are lugs on the inside end of sleeve C, their function being to engage the arms of spider F, and hold spider F motionless with reference to sleeve C.

$p$ is an arrow indicating the direction from which the chain comes when heaving in.

$q$ is an arrow indicating the direction in which the chain is discharged when heaving in.

D' is a supplementary heaving ring, with handle bar socket U', and circular hole T' in which rotates the pin $Y^7$ of supplementary heaving pawl $X^4$.

$Y^3$ is a thread on pin $Y^2$, on which is screwed a nut $Y^4$ with pin $Y^5$ and washer $Y^6$.

O' is a supplementary ratchet in all respects similar to ratchet O. Supplementary heaving pawl $X^4$ engages in supplementary ratchet O'.

It will be noted that handle bar socket U' is set at an angle, in order to leave more space between the ends of the handle bars while in operation.

Figures 6, 7, 8, 12:
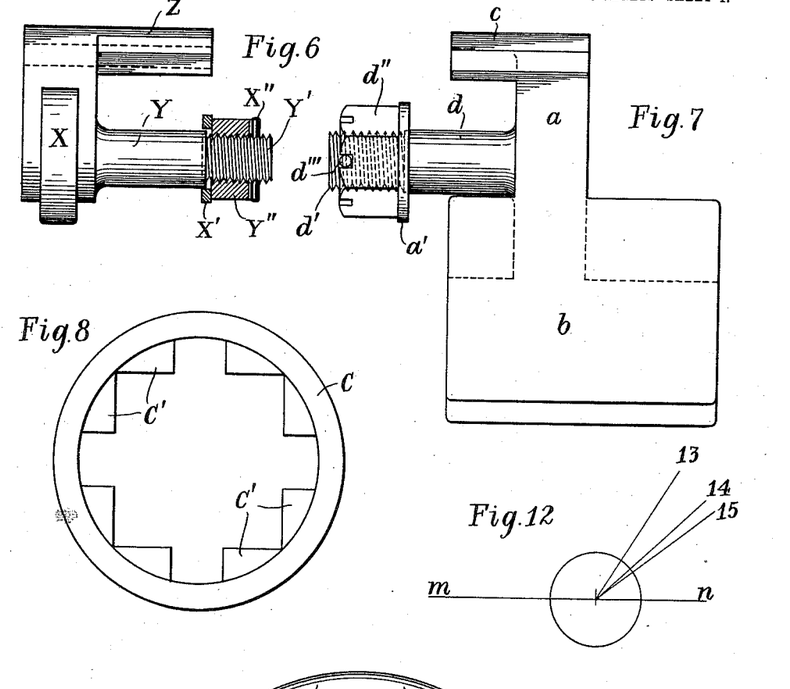
Fig. 6 is a plan view of the top face of heaving pawl X.
Fig. 7 is a plan view of the top face of the holding pawl $a$.
Fig. 8 is an end view in elevation of the outer end of sleeve C.
Fig. 12 is a diagrammatic view showing the functioning of the trip and brake device (already referred to as patented April 4, 1911) at different positions of the handle bar.
Figure 9:
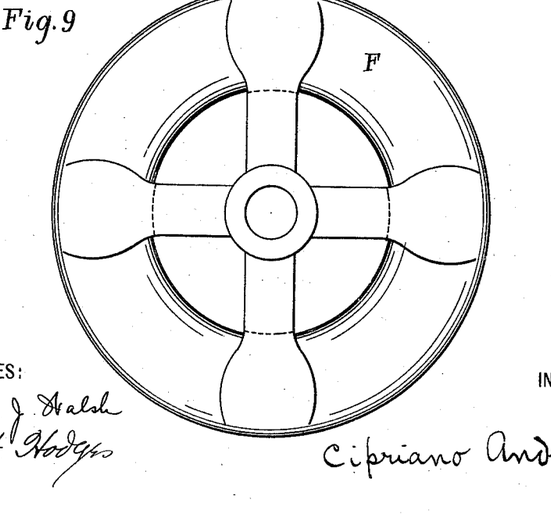
Fig. 9 is an end view in elevation of the outer face of spider F.
Figures 13, 14, 15:
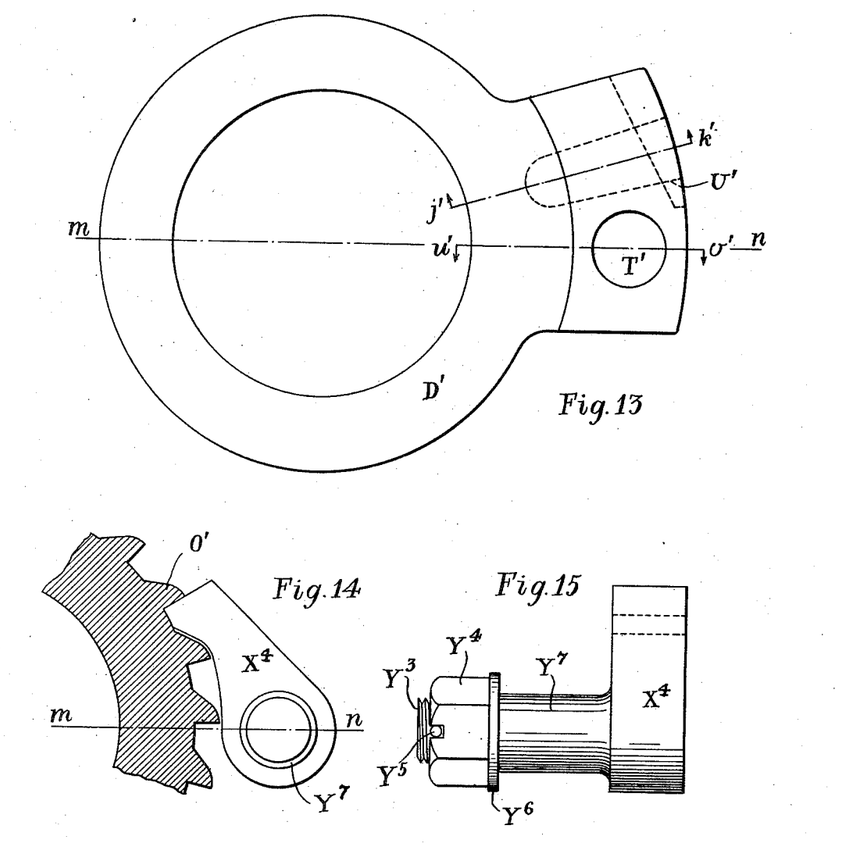
Fig. 13 is an end elevation of the outer face of supplementary heaving ring D′ looking inboard from the starboard side.
Fig. 14 is an end elevation of supplementary heaving pawl X′.
Fig. 15 is a plan view of the top of supplementary heaving pawl X′.
Figure 16:
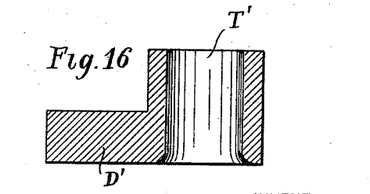
Fig. 16 is a detail section of supplementary heaving ring D′ on line $u'$—$v'$ (Fig. 13).
Figure 17:
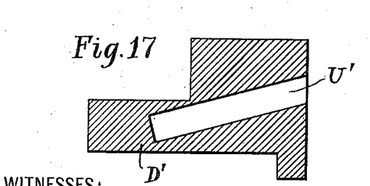
Fig. 17 is a detail section of supplementary heaving ring D′ on line $j'$—$k'$ (Fig. 13).

Numerals 13, 14 and 15 in Fig. 12 denote different positions of the handle bar in tripping and braking.

The operation of the trip and brake features of the device here shown has been fully elucidated and explained in my said United States Patent No. 988,428, of April 4, 1911.

Figure 1:
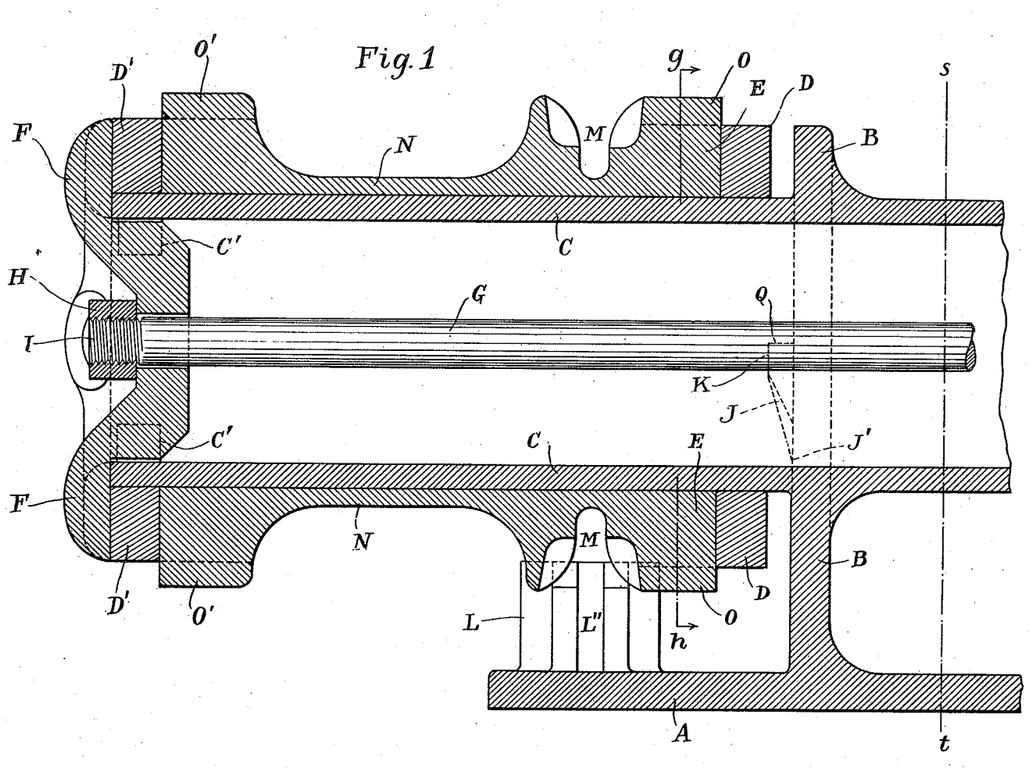
Figure 2:
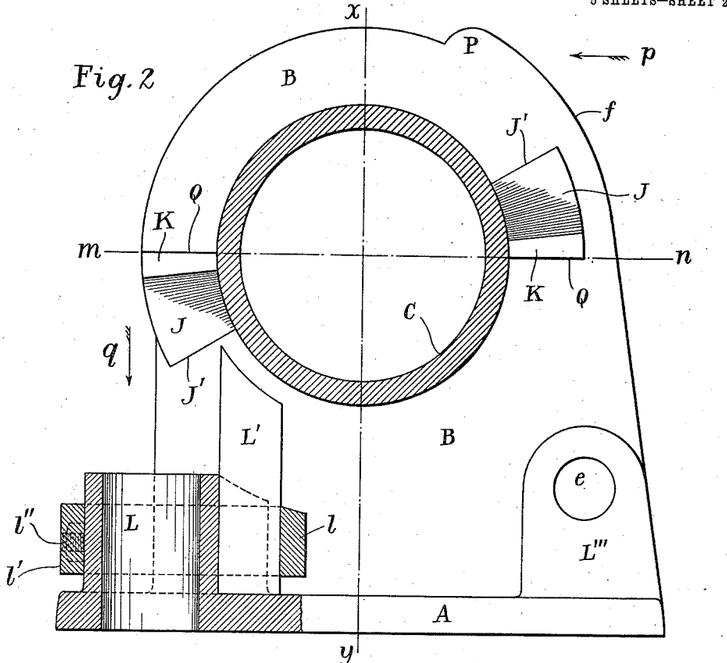
Fig. 2 is an end elevation of my device looking inboard from the starboard side with the sheave removed.
Figure 3:
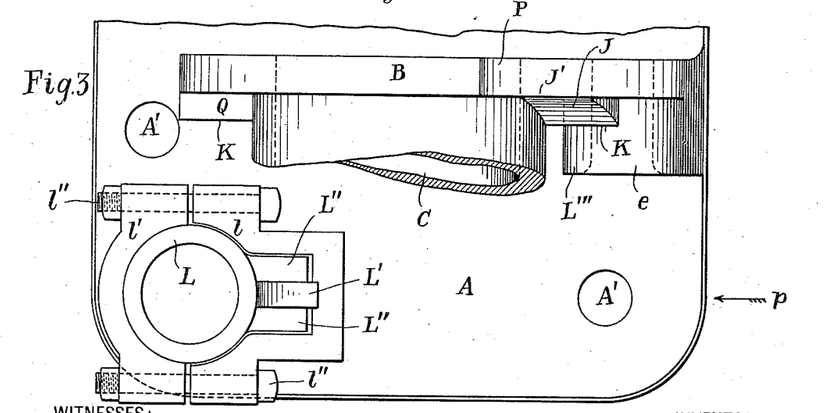
Fig. 3 is a plan view of the starboard half of my device with certain parts removed.
Figures 4, 5, 10, 11:
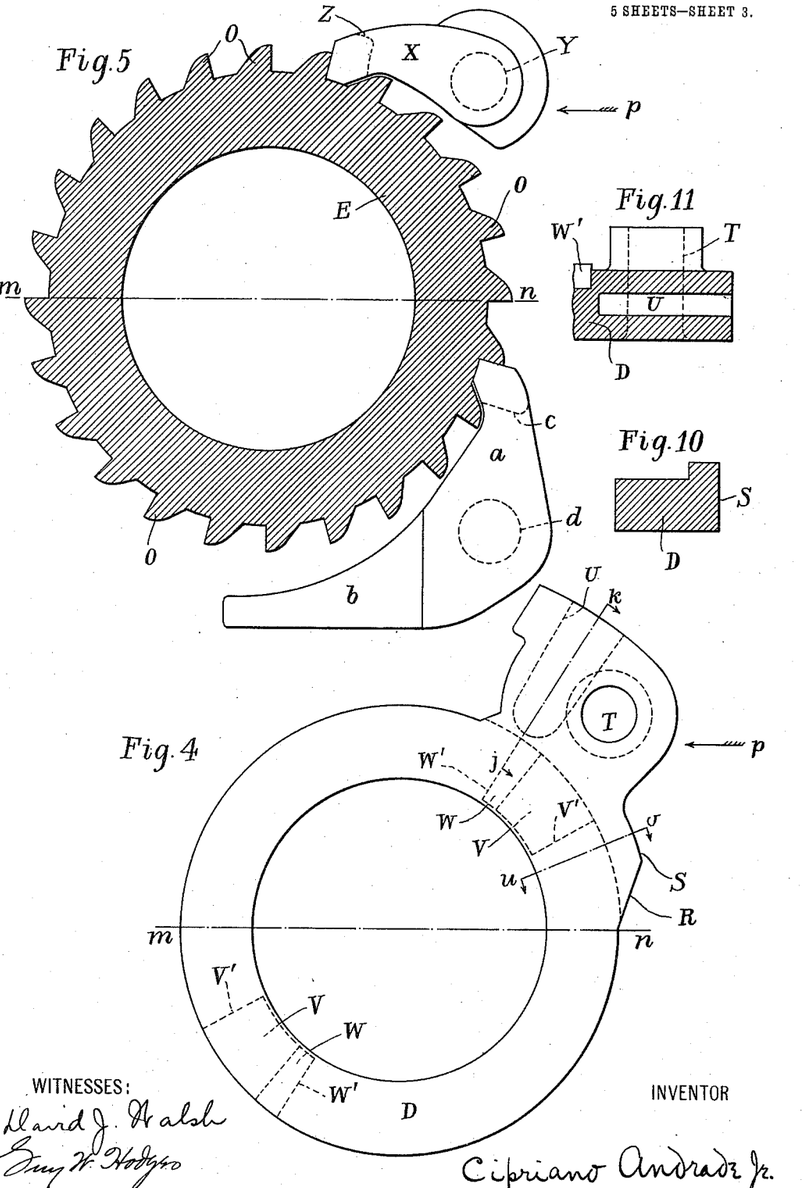
Fig. 4 is an end elevation of the outer face of trip ring D looking inboard from the starboard side.
Fig. 5 is a transverse section in elevation of the drum E, taken on line $g$—$h$ (Fig. 1), and showing the pawls X and $a$ in position, all viewed looking inboard from the starboard side.
Fig. 10 is a detail section of trip ring D, on line $u$—$v$ (Fig. 4).
Fig. 11 is a detail section of trip ring D, on line $j$—$k$ (Fig. 4).

The operation of my device here sought to be patented is as follows: When it is desired to heave in chain, drum E is rotated in the direction $p$ Fig. 5 by means of heaving pawl X and trip ring D, actuated by a handle bar inserted in socket U as is the common practice with pawl and ratchet windlasses, and as described in my said Letters Patent No. 988,428; the holding pawl $a$, holding drum E motionless during the forward or recover motion of the handle bar. During such forward or recover motion of the handle bar, it will be noted that the drum E, in the form of windlass shown in my said Letters Patent 988,428 remains motionless. In other words, such windlasses are single acting, and are intermittent in action and do not permit of a continuous heaving in of the chain. But by means of the device here shown, it is possible to secure a continuous heaving in of the chain, in the following manner: During the heave motion (in the direction $p$) of trip ring D, the supplementary heaving ring D' is moved through the forward or recover motion (against the direction $p$); and during the recovery motion of trip ring D, the supplementary heaving ring D' is moved through the heave motion; thus the drum E is continuously and steadily rotated in the direction $p$.

Where it is desired to exert very great tractive force upon the chain, both trip ring D and supplementary heaving ring D' may be moved in the direction $p$, thus concentrating the power of both handle bars in the same direction at the same time.

Where it is desired to operate the supplementary heaving ring, pawl and ratchet in combination with the automatic trip and brake device shown in my Patent No. 988,428, the handle bar should first be withdrawn from socket U' before tripping the windlass.

I have shown my improvement as applied to a windlass of the horizontal type, but exactly the same arrangement of parts would be operative if the windlass were set vertical, making web plate B set flat on deck. The only change necessary would be to put springs back of pawls X, X⁴, and *a* to make them engage in ratchets O and O' respectively, instead of using the force of gravity for that purpose, as shown in the present drawings.

Where chain only is to be used, the smooth barrel N may be eliminated, thus making the device more compact.

I claim:

1. In windlasses in combination: a web plate rigid with the vessel's deck, said web plate having wedges on its face nearest the trip ring hereinafter mentioned, and having also a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on one of its faces wedges adapted for effective rotary engagement with the wedges on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said sleeve; a supplementary heaving pawl on said supplementary heaving ring, said supplementary heaving pawl engaging said supplementary ratchet teeth; a member at the end of the sleeve farthest from the web plate, said member being fixed with reference to said sleeve, and being adapted to resist any motion of the drum away from the web plate; means for imparting a reciprocating motion of rotation to said trip ring; means for imparting a reciprocating motion of rotation to said supplementary heaving ring.

2. In windlasses in combination; a web plate rigid with the vessel's deck, said web plate having a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said sleeve; a supplementary heaving pawl on said supplementary heaving ring, said supplementary heaving pawl engaging said supplementary ratchet teeth; means for imparting a reciprocating motion of rotation to said trip ring; means for imparting a reciprocating motion of rotation to said supplementary heaving ring.

3. In windlasses in combination; a web plate rigid with the vessel's deck, said web plate having wedges on its face nearest the trip ring hereinafter mentioned, and having also a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on one of its faces wedges adapted for effective rotary engagement with the wedges on the face of the web plate, whereby said strip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said sleeve; a supplementary heaving pawl on said supplementary heaving ring, said supplementary heaving pawl engaging said supplementary ratchet teeth; a member at the end of the sleeve farthest from the web plate, said member being fixed with reference to said sleeve, and being adapted to resist any motion of the drum away from the web plate; means for imparting a reciprocating motion of rotation to said trip ring; means for imparting a reciprocating motion of rotation to said supplementary heaving ring.

4. In windlasses in combination: a web plate rigid with the vessel's deck, said web plate having a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said sleeve; a supplementary heaving pawl on said supplementary heaving ring, said supplementary heaving pawl engaging said supplementary ratchet teeth; means for imparting a reciprocating motion of rotation to said trip ring; means for imparting a reciprocating motion of rotation to said supplementary heaving ring.

5. In windlasses in combination: a web plate rigid with the vessel's deck, said web plate having a wedge on its face nearest the trip ring hereinafter mentioned, and having also a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on one of its faces a wedge adapted for effective rotary engagement with the wedge on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said sleeve; a supplementary heaving pawl on said supplementary heaving ring, said supplementary heaving pawl engaging said supplementary ratchet teeth; a member at the end of the sleeve farthest from the web plate, said member being fixed with reference to said sleeve, and being adapted to resist any motion of the drum away from the web plate; means for imparting a reciprocating motion of rotation to said trip ring; means for imparting a reciprocating motion of rotation to said supplementary heaving ring.

6. In windlasses in combination: a web plate rigid with the vessel's deck, said web plate having a wedge on its face nearest the trip ring hereinafter mentioned, and having also a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on one of its faces a wedge adapted for effective rotary engagement with the wedge on the face of the web plate, whereby said trip ring may be forced away from said web plate and against the end of said drum, said trip ring also carrying on itself a cam designed for effective engagement with the trip lug on the holding pawl; whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said sleeve; a supplementary heaving pawl on said supplementary heaving ring, said supplementary heaving pawl engaging said supplementary ratchet teeth; a member at the end of the sleeve farthest from the web plate, said member being fixed with reference to said sleeve, and being adapted to resist any motion of the drum away from the web plate; means for imparting a reciprocating motion of rotation to said trip ring; means for imparting a reciprocating motion of rotation to said supplementary heaving ring.

7. In windlasses in combination: a web plate rigid with the vessel's deck, said web plate having wedges on its face nearest the trip ring hereinafter mentioned, and having also a cam adapted for effective engagement with the trip lug on the heaving pawl hereinafter mentioned; a drum rotatable about an axis perpendicular to said web plate, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on one of its faces wedges adapted for effective rotary engagement with the wedges on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said drum; a supplementary heaving pawl on said supplementary heaving ring, said supplementary heaving pawl engaging said supplementary ratchet teeth; a member at the end of the drum farthest from the web plate, said member being fixed with reference to said web plate, and being adapted to resist any motion of the drum away from the web plate; means for imparting a reciprocating motion of rotation to said trip ring; means for imparting a reciprocating motion of rotation to said supplementary heaving ring.

8. In windlasses in combination; a web plate rigid with the vessel's deck, said web plate having a cam adapted for effective engagement with the trip lug on the heaving pawl hereinafter mentioned; a drum rotatable about an axis perpendicular to said web plate, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said drum; a supplementary heaving pawl on said supplementary heaving ring, said supplementary heaving pawl engaging said supplementary ratchet teeth; means for imparting a reciprocating motion of rotation to said trip ring; means for imparting a reciprocating motion of rotation to said supplementary heaving ring.

9. In windlasses in combination; a web plate rigid with the vessel's deck, said web plate having wedges on its face nearest the trip ring hereinafter mentioned, and having also a cam adapted for effective engagement with the trip lug on the heaving pawl hereinafter mentioned; a drum rotatable about an axis perpendicular to said web plate, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrrying on one of its faces wedges adapted for effective rotary engagement with the wedges on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said drum; a supplementary heaving pawl on said supplementary heaving ring, said supplementary heaving pawl engaging said supplementary ratchet teeth; a member at the end of the drum farthest from the web plate, said member being fixed with reference to said web plate, and being adapted to resist any motion of the drum away from the web plate; means for imparting a reciprocating motion of rotation to said trip ring; means for imparting a reciprocating motion of rotation to said supplementary heaving ring.

10. In windlasses in combination: a web plate rigid with the vessel's deck, said web plate having a cam adapted for effective engagement with the trip lug on the heaving pawl hereinafter mentioned; a drum rotatable about an axis perpendicular to said web plate, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said drum; a supplementary heaving pawl on said supplementary heaving ring, said supplementary heaving pawl engaging said supplementary ratchet teeth; means for imparting a reciprocating motion of rotation to said trip ring; means for imparting a reciprocating motion of rotation to said supplementary heaving ring.

11. In windlasses in combination: a web plate rigid with the vessel's deck, said web plate having a wedge on its face nearest the trip ring hereinafter mentioned, and having also a cam adapted for effective engagement with the trip lug on the heaving pawl hereinafter mentioned; a drum rotatable about an axis perpendicular to said web plate, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on one of its faces a wedge adapted for effective rotary engagement with the wedge on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said drum; a supplementary heaving pawl on said supplementary heaving ring, said supplementary heaving pawl engaging said supplementary ratchet teeth; a member at the end of the drum farthest from the web plate, said member being fixed with reference to said web plate, and being adapted to resist any motion of the drum away from the web plate; means for imparting a reciprocating motion of rotation to said trip ring; means for imparting a reciprocating motion of rotation to said supplementary heaving ring.

12. In windlasses in combination: a web plate rigid with the vessel's deck, said web plate having a wedge on its face nearest the trip ring hereinafter mentioned, and having also a cam adapted for effective engagement with the trip lug on the heaving pawl hereinafter mentioned; a drum rotatable about an axis perpendicular to said web plate, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on one of its faces a wedge adapted for effective rotary engagement with the wedge on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; supplementary ratchet teeth on the drum, said supplementary ratchet teeth pointing in the same direction as said first mentioned ratchet teeth; a supplementary heaving ring rotatable concentrically with said drum; a supplementary heaving pawl on said supplementary heaving ring, said supplementary heaving pawl engaging said supplementary ratchet teeth; a member at the end of the drum farthest from the web plate, said member being fixed with reference to said web plate, and being adapted to resist any motion of the drum away from the web plate; means for imparting a reciprocating motion of rotation to said trip ring; means for imparting a reciprocating motion of rotation to said supplementary heaving ring.

13. In windlasses in combination: a web plate rigid with the vessel's deck, said web plate having wedges on its face nearest the trip ring hereinafter mentioned, and having also a cam adapted for effective engagement with the trip lug on the heaving pawl hereinafter mentioned; a drum rotatable about an axis perpendicular to said web plate, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on one of its faces wedges adapted for effective rotary engagement with the wedges on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a supplementary heaving ring rotatable concentrically with said drum; a supplementary heaving pawl on said supplementary heaving ring, said supplementary heaving pawl engaging said ratchet teeth; a member at the end of the drum farthest from the web plate, said member being fixed with reference to said web plate, and being adapted to resist any motion of the drum away from the web plate; means for imparting a reciprocating motion of rotation to said trip ring; means for imparting a reciprocating motion of rotation to said supplementary heaving ring.

14. In a windlass in combination; a web plate rigid with the vessel's deck, said web plate having a cam adapted for effective engagement with the trip lug on the heaving pawl hereinafter mentioned; a drum rotatable about an axis perpendicular to said web plate, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a supplementary heaving ring rotatable concentrically with said drum; a supplementary heaving pawl on said supplementary heaving ring, said supplementary heaving pawl engaging said ratchet teeth; means for imparting a reciprocating motion of rotation to said trip ring; means for imparting a reciprocating motion of rotation to said supplementary heaving ring.

15. In windlasses in combination; a web plate rigid with the vessel's deck, said web plate having wedges on its face nearest the trip ring hereinafter mentioned, and having also a cam adapted for effective engagement with the trip lug on the heaving pawl hereinafter mentioned; a drum rotatable about an axis perpendicular to said web plate, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on one of its faces wedges adapted for effective rotary engagement with the wedges on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a supplementary heaving ring rotatable concentrically with said drum; a supplementary heaving pawl on said supplementary heaving ring, said supplementary heaving pawl engaging said ratchet teeth; a member at the end of the drum farthest from the web plate, said member being fixed with reference to said web plate, and being adapted to resist any motion of the drum away from the web plate; means for imparting a reciprocating motion of rotation to said trip ring; means for imparting a reciprocating motion of rotation to said supplementary heaving ring.

16. In windlasses in combination: a web plate rigid with the vessel's deck, said web plate having a cam adapted for effective engagement with the trip lug on the heaving pawl hereinafter mentioned; a drum rotatable about an axis perpendicular to said web plate, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a supplementary heaving ring rotatable concentrically with said drum; a supplementary heaving pawl on said supplementary heaving ring, said supplementary heaving pawl engaging said ratchet teeth; means for imparting a reciprocating motion of rotation to said trip ring; means for imparting a reciprocating motion of rotation to said supplementary heaving ring.

17. In windlasses in combination: a web plate rigid with the vessel's deck, said web plate having a wedge on its face nearest the trip ring hereinafter mentioned, and having also a cam adapted for effective engagement with the trip lug on the heaving pawl hereinafter mentioned; a drum rotatable about an axis perpendicular to said web plate, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on one of its faces a wedge adapted for effective rotary engagement with the wedge on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a supplementary heaving ring rotatable concentrically with said drum; a supplementary heaving pawl on said supplementary heaving ring, said supplementary heaving pawl engaging said ratchet teeth; a member at the end of the drum farthest from the web plate, said member being fixed with reference to said web plate, and being adapted to resist any motion of the drum away from the web plate; means for imparting a reciprocating motion of rotation to said trip ring; means for imparting a reciprocating motion of rotation to said supplementary heaving ring.

18. In windlasses in combination; a web plate rigid with the vessel's deck, said web plate having a cam adapted for effective engagement with the trip lug on the heaving pawl hereinafter mentioned; a drum rotatable with reference to said web plate, said drum having ratchet teeth; a holding pawl fixed with reference to the web plate, and engaging said ratchet teeth, said holding pawl having a trip lug; a trip ring rotatable concentrically with said drum, said trip ring carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a supplementary heaving ring rotatable concentrically with said drum; a supplementary heaving pawl on said supplementary heaving ring, said supplementary heaving pawl engaging said ratchet teeth; means for imparting a reciprocating motion of rotation to said trip ring; means for imparting a reciprocating motion of rotation to said supplementary heaving ring.

19. In windlasses in combination; a web plate rigid with the vessel's deck, said web plate having a cam adapted for effective engagement with the trip lug on the heaving pawl hereinafter mentioned; a drum rotatable with reference to said web plate, said drum having ratchet teeth; a holding pawl fixed with reference to the web plate, and engaging said ratchet teeth; a ring rotatable concentrically with said drum; a heaving pawl on said ring, said heaving pawl engaging said ratchet teeth, said heaving pawl having a trip lug, whereby said pawl may be brought into effective tripping engagement with the cam on the web plate; a supplementary heaving ring rotatable concentrically with said drum; a supplementary heaving pawl on said supplementary heaving ring, said supplementary heaving pawl engaging said ratchet teeth; means for imparting a reciprocating motion of rotation to said ring; means for imparting a reciprocating motion of rotation to said supplementary heaving ring.

20. In windlasses in combination: a web plate rigid with the vessel's deck; a drum rotatable with reference to said web plate, said drum having ratchet teeth; a holding pawl fixed with reference to the web plate, and engaging said ratchet teeth, said holding pawl having a trip lug; a trip ring rotatable concentrically with said drum, said trip ring carrying on itself a cam designed for effective engagement with the trip lug on the holding pawl, whereby said holding pawl may be tripped; a heaving pawl on said trip ring, said heaving pawl engaging said ratchet teeth; a supplementary heaving ring rotatable concentrically with said drum; a supplementary heaving pawl on said supplementary heaving ring, said supplementary heaving pawl engaging said ratchet teeth; means for imparting a reciprocating motion of rotation to said trip ring; means for imparting a reciprocating motion of rotation to said supplementary heaving ring.

21. In windlasses in combination: a web plate rigid with the vessel's deck, said web plate having a wedge on its face nearest the ring hereinafter mentioned, and having also a cam adapted for effective engagement with the trip lug on the heaving pawl hereinafter mentioned; a drum rotatable with reference to said web plate, said drum having ratchet teeth; a holding pawl fixed with reference to the web plate, and engaging said ratchet teeth; a ring disposed between the end of the drum and the face of the web plate, said ring being rotatable concentrically with said drum, said trip ring carrying on one of its faces a wedge adapted for effective rotary engagement with the wedge on the face of the web plate, whereby said trip ring may be forced away from said web plate and against the end of said drum; a heaving pawl on said ring, said heaving pawl engaging said ratchet teeth, said heaving pawl having a trip lug, whereby said pawl may be brought into effective tripping engagement with the cam on the web plate; a supplementary heaving ring rotatable concentrically with said drum; a supplementary heaving pawl on said supplementary heaving ring, said supplementary heaving pawl engaging said ratchet teeth; a member at the end of the drum farthest from the web plate, said member being fixed with reference to said web plate, and being adapted to resist any motion of the drum away from the web plate; means for imparting a reciprocating motion of rotation to said trip ring; means for imparting a reciprocating motion of rotation to said supplementary heaving ring.

22. In windlasses in combination: a web plate rigid with the vessel's deck, said web plate having a wedge on its face nearest the trip ring hereinafter mentioned; a drum rotatable with reference to said web plate, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on one of its faces a wedge adapted for effective rotary engagement with the wedge on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth; a supplementary heaving ring rotatable concentrically with said drum; a supplementary heaving pawl on said supplementary heaving ring, said supplementary heaving pawl engaging said ratchet teeth; a member at the end of the drum farthest from the web plate, said member being fixed with reference to said web plate, and being adapted to resist any motion of the drum away from the web plate; means for imparting a reciprocating motion of rotation to said trip ring; means for imparting a reciprocating motion of rotation to said supplementary heaving ring.

23. In windlasses in combination: a web plate rigid with the vessel's deck, said web plate having a wedge on its face nearest the trip ring hereinafter mentioned, and having also a cam adapted for effective engagement with the trip lug on the heaving pawl hereinafter mentioned; a drum rotatable with reference to said web plate, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable concentrically with said drum, said trip ring carrying on one of its faces a wedge adapted for effective rotary engagement with the wedge on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a supplementary heaving ring rotatable concentrically with said drum; a supplementary heaving pawl on said supplementary heaving ring, said supplementary heaving pawl engaging said ratchet teeth; a member at the end of the drum farthest from the web plate, said member being fixed with reference to said web plate, and being adapted to resist any motion of the drum away from the web plate; means for imparting a reciprocating motion of rotation to said trip ring; means for imparting a reciprocating motion of rotation to said supplementary heaving ring.

CIPRIANO ANDRADE, Jr.

Witnesses:
ADOLPH WIDDER,
ARTHUR C. JOHNSON.

Copies of this patent may be obtained for five cents each, by addressing the "Commissioner of Patents, Washington, D. C."